March 22, 1960

R. W. RIKER ET AL 2,929,688

COMPOSTING APPARATUS

Filed May 27, 1955

INVENTORS
ALTON M. BRAYTON
RALPH W. RIKER
WILBUR C. WRIGHT
BY
Winston E. Miller
ATTORNEY

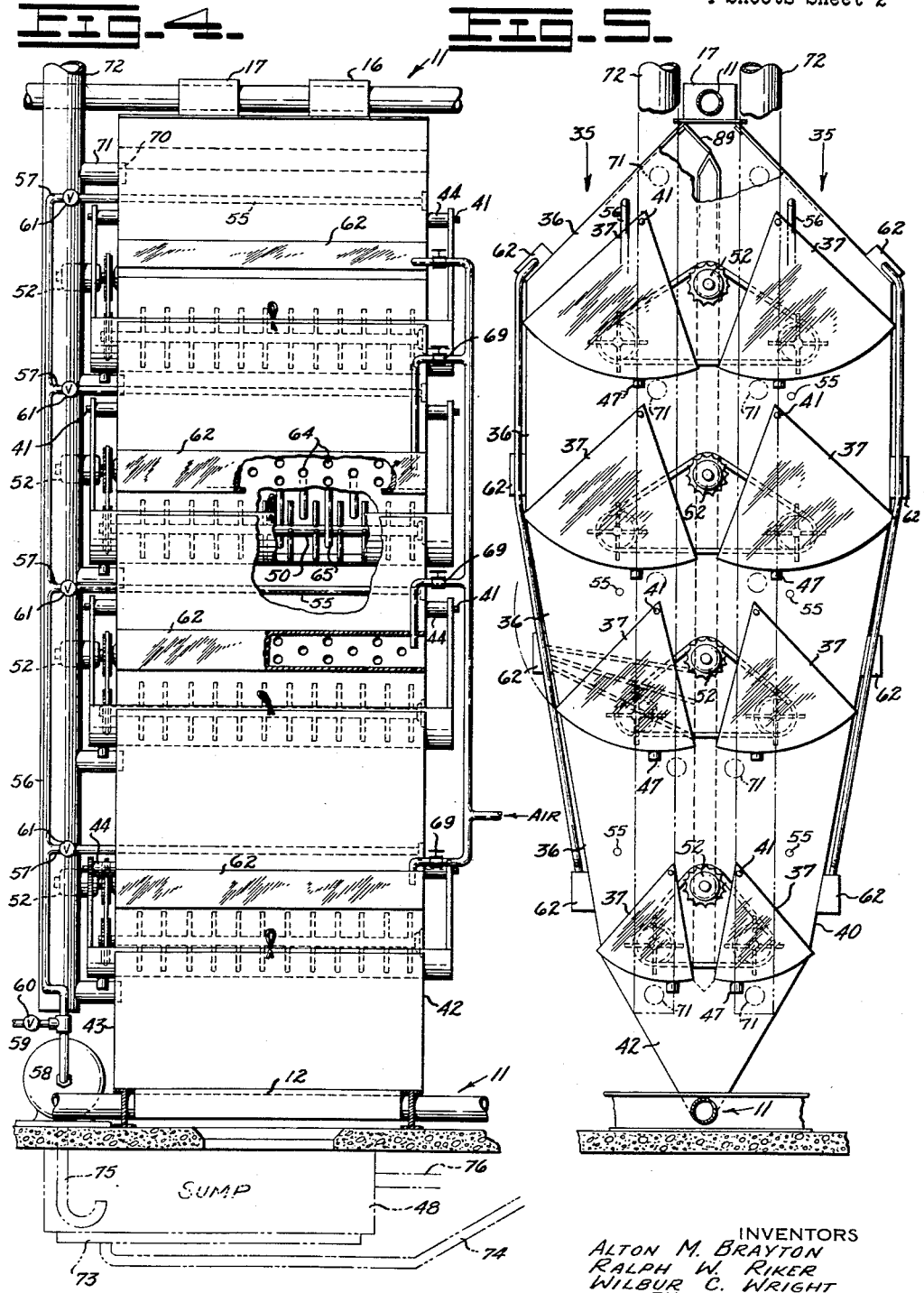

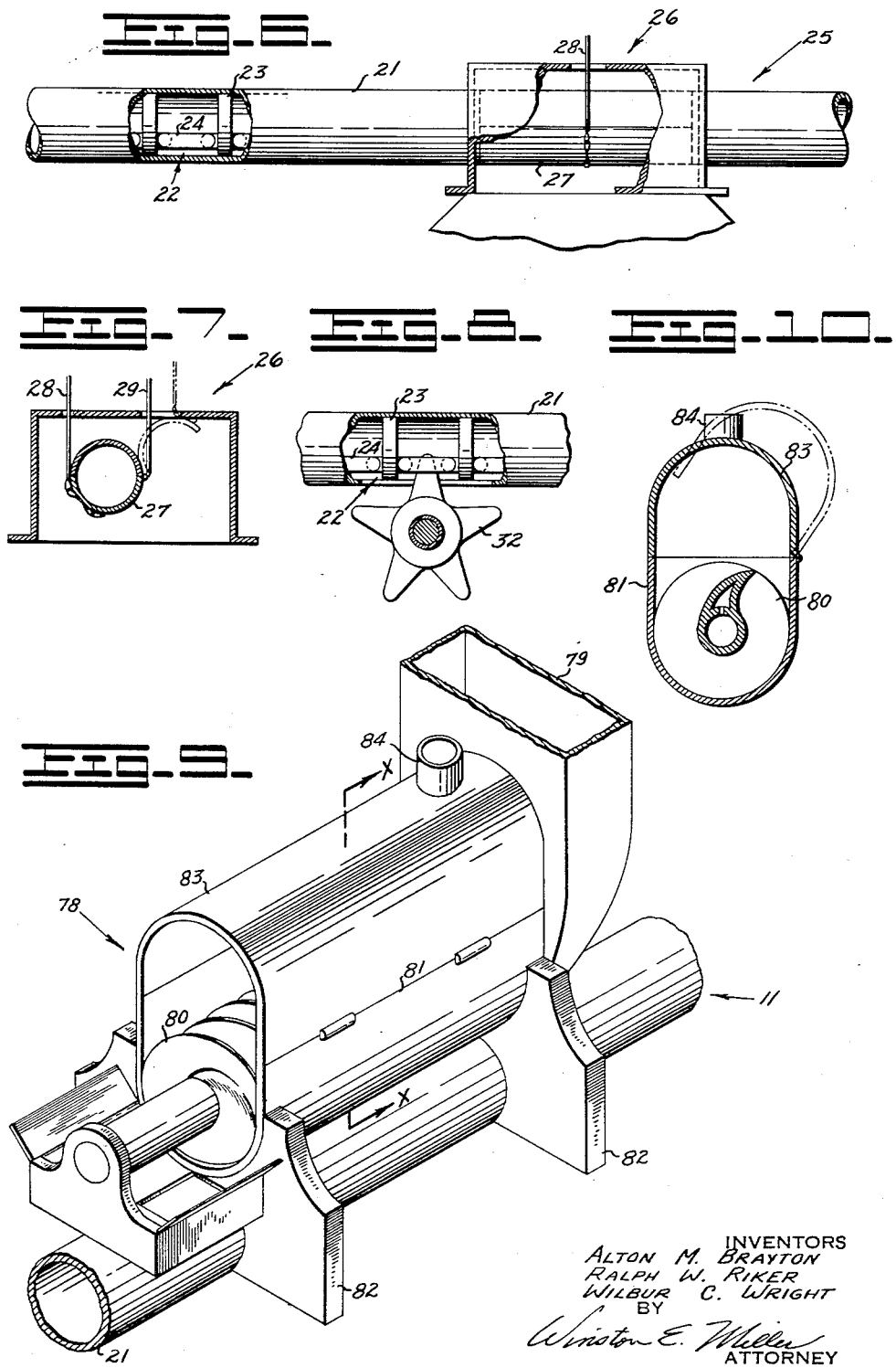

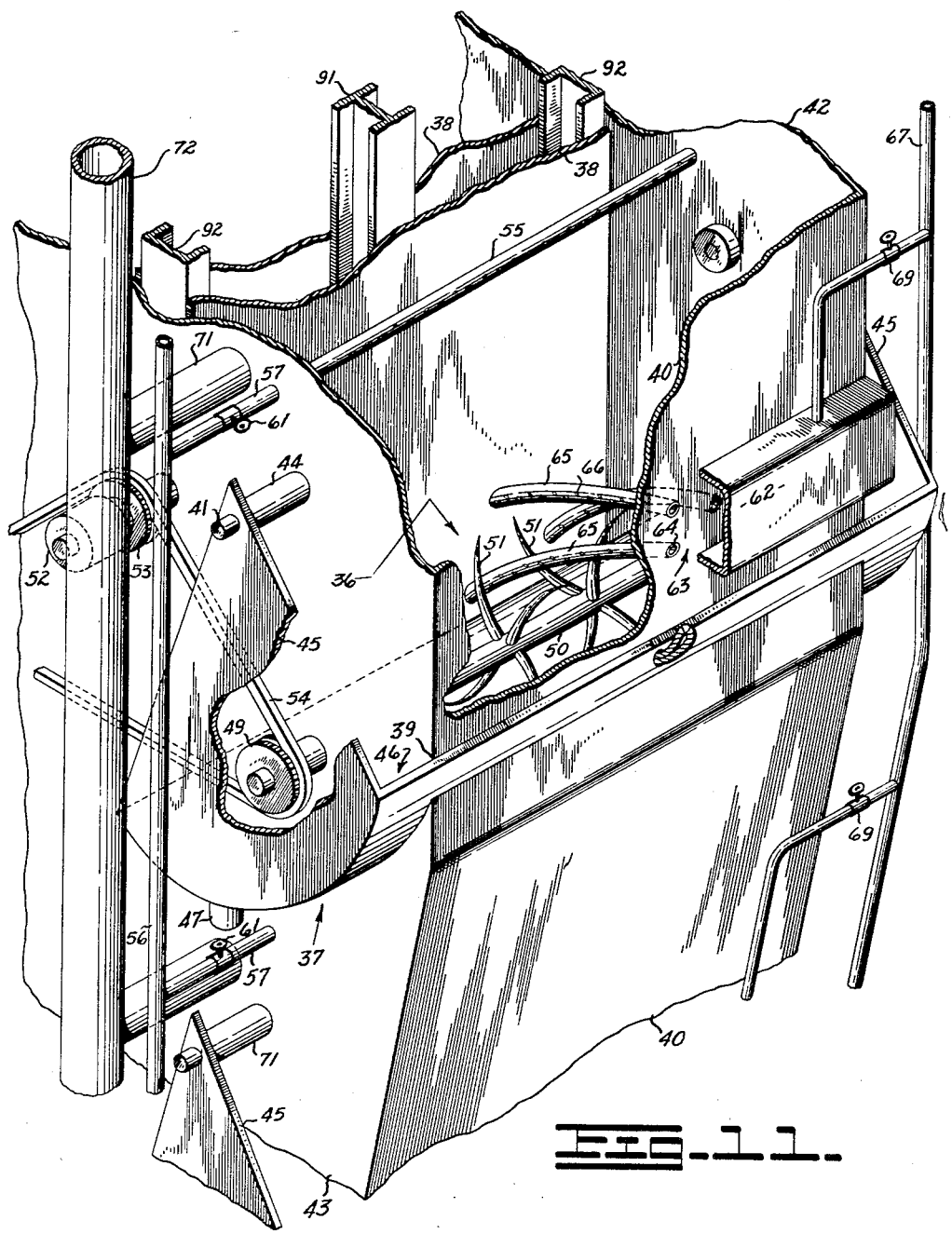

United States Patent Office 2,929,688
Patented Mar. 22, 1960

2,929,688

COMPOSTING APPARATUS

Ralph W. Riker and Alton M. Brayton, Lansing, and Wilbur C. Wright, Williamston, Mich., assignors to Sanitary Disposal Corporation, Lansing, Mich., a corporation of Michigan Application May 27, 1955, Serial No. 511,574

2 Claims. (Cl. 23—259.1)

The present invention relates to aerobic composting plants and apparatus therefor and more particularly relates to a vertically stacked composter having recycling means for fluid and solid inoculant and being provided with simple and improved means for the handling of mixed garbage and/or sewage including improved aeration, agitation, moisture control, thermal control, and material handling means.

Composting, employing aerobic bacterial principles of operation, has long been known and observed. In recent years the natural processes employing aerobic bacteriological or biological decomposition of organic matter have received considerable investigation which looked to (a) acceleration of the natural process, and (b) the reduction of labor requirements involved in accomplishing composting. Composted organic material from natural wastes such as sewage and/or garbage offers some considerable contribution in elimination of presently undesirable organic waste matter while making a product available which (a) improves the water holding capacity of the soil, (b) improves the tillage characteristics of the soil, (c) inhibits the rapid leaching of nitrogen by releasing the nitrogen slowly, and (d) favors growth of soil microorganisms resulting in a release to the soil of certain constituents which can be utilized in the growth of plants. Further, the compost product is obtained while eliminating noxious and bothersome organic waste materials.

Many processes and a variety of apparatus have appeared in an attempt to achieve a workable composting system. Some apparatus have emphasized thermal control, other apparatus have attempted timed agitation, still other apparatus have suggested improved aeration systems, and still other apparatus have proposed structures employing internal conveyors seeking for substantial continuousness of operation. Some processes have sought to combine some of the above apparatus developments with the inclusion of specific inoculating bacteria. Whether or not specific strains of externally supplied aerobic microorganisms have beneficial action on a raw organic materials treated, the thesis of present thought is that the achievement of substantially automatic composting and its acceleration will be found in improved mechanical handling which combines the known process and apparatus variables in such a salutary fashion that a workable composting plant can be brought into being. To date no apparatus has provided a combination of integrated features in such a manner as to accomplish continual and thorough composting in large scale operation.

It is therefore among the objects of the present invention to provide a composting plant for aerobic bacterial decomposition of organic matter which substantially accelerates the composting process.

It is another object of the present invention to provide a self-sustaining solid-fluid inoculant and reinoculant supplying apparatus.

It is another object to provide an entire disposal plant wherein thermal and moisture control is fully adjustable.

A further object is to present a composting plant and apparatus wherein the variables present in composting are simply adjusted to meet ideal control conditions.

It is another object of the present composting apparatus to teach a structure which integrates material handling of raw composting material in a cycling system for large scale compost production.

Other objects including apparatus simplicity and economy in construction, maintenance and plant operation will become increasingly apparent to those skilled in the art as the description proceeds.

Figure 4 is a front elevation view of a composter unit in accord with the present invention with a portion cut away to indicate agitator placement, air manifold features, and showing the integration of the structure with the entire composting plant by loading and unloading connection to the tube conveyor. This figure also indicates the positioning of the liquid inoculant sump shown in phantom line beneath the composter unit structure.

Figure 5 is a side elevation of the structure shown in Fig. 4 and showing the clam-shell drop bottoms, and the location of exhaust stack entries as integrated in the structure to provide exhaust for individual compartments in the bin-like composter unit.

Figure 6 is a partial front elevation of a section of tubular conveyor showing a drop chute housing cut away to reveal the conveyor port or trap in closed position.

Figure 7 is a cross section elevation taken on line VII—VII of Fig. 6 and showing in phantom line the position of the closure of the conveyor port when the conveyor trap is open for gravity dropping material.

Figure 8 is a detail elevation view of the sprocket drive causing the tube conveyor to urge material through the tube course.

Figure 9 is a perspective view of the heated screw conveyor and mixer and showing the hinged hood in phantom line enclosing the mixer and including a suitable venting means for gases.

Figure 10 is a cross section elevation taken on line X—X of Fig. 9 and indicating the hollow character of the spiral blades and shaft through which a heating medium is pumped for adjustment of temperature of organic feed.

Figure 11 is a cut away perspective view of one compartment showing the spacial relationship between the agitation means, the clam-shell drop bottom, the liquid control, the air tubes and manifold.

*General description*

Figure 1:
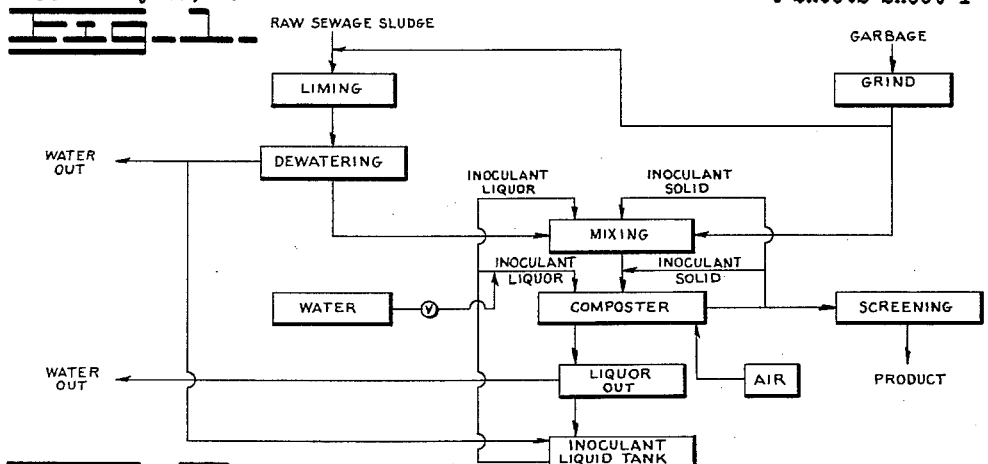
Figure 1 is a flow diagram of a composting plant in accord with the present invention and indicates (processwise) the inoculant cycling of both liquid and solid organic inoculating material.

In general the novel composting plant described herein is capable of composting garbage and/or sewage sludge under aerobic conditions. The sewage sludge enters separately and is passed through a liming tank and is subsequently dewatered before being passed to a mechanical, temperature controlled mixer. The aqueous effluent from the dewatering operation is returned to basic water conditioning equipment not a part of the present invention unless a portion of the water is desired to be used as a liquid inoculant supply. Where the liquid inoculant supply requires an additional source the liquor material is passed, as shown in Fig. 1, to an inoculant sump or tank. The latter source is preferred since the aqueous effluent resulting from the dewatering step may contain substantial amounts of undesirable bacteria. At the mechanical mixer the garbage, which has been comminuted as by crushing, grinding, or shredding, is merged with the sewage sludge and thoroughly mixed and heated as necessary. Where the garbage requires dewatering to adjust the moisture content, the garbage material may be merged after comminution with the sewage sludge prior to liming. After thorough mixing in the heated screw-type mixer, the raw organic material for composting is passed by an endless conveyor to composting units and gravity dropped into the upper compartments thereof. The composting units are vertically stacked or tiered structures of general bin appearance and are provided with a plurality of compartments, one above the other. The compartments are separated one from the other by clam-shell bottoms which normally are pivoted into closed position against a central planal barrier separating the front column of compartments of a given composting unit from the rear column of compartments. Thus, in a given unit, two symmetrical columns of compartments are provided having identical but oppositely oriented clam-shell bottoms. The loading entry of the units is on the top and a selective gate determines whether a given charge of material is placed in the front or rear column of compartments. The endless conveyor is provided with an outlet station which is selectively opened or closed as desired over the entry to the composting units. Each compartment is provided with an exhaust vent for circulation assistance and exhausts air and gases continually. Each compartment is provided with a liquid line for selective delivery of water or inoculant substantially above the normal level of the composting material. Air lines are positioned transversely across each of the compartments through which compressed air is fed intermittently or continuously to the pile of composting material. Mechanical agitation is provided longitudinally through each compartment for selectively turning the composting material as desired. The bin or chute-like character of the lowest compartments permits feeding of the completed compost to a discharge port arranged above the tube conveyor. Perforations in the tube conveyor permit communication of any liquid material directly to the inoculant sump. The completed compost material is carried by the tube conveyor through a looped path by the conveyor loading port at the mixer to a moisture control port directly above the mixer. Where it is desired to lower the moisture content in the mix or to inoculate the mix with solid, relatively dry compost material, the moisture control port is opened and the solid compost is dropped into the mixer. When the moisture control port is closed the composted material continues in its conveyor path to the outlet station above the composter unit entry. If the composter entry is opened, the fully composted material is dropped into the upper charging compartments as desired for solid inoculation at this point. If the composter entry is closed, the completely composted material is moved along the looped conveyor path and delivered to selective units along the path or dropped out at the product discharge port where the composted material undergoes screening and grading, and preparation for either storage or shipping. If tests at the product discharge position indicate incomplete composting the discharge port is closed and the material is recycled as desired to any selected station and/or any particular composting unit.

Beneath the composting units a liquid inoculant sump or tank is provided which receives liquor drainings as desired from the dewatering unit, from the composting units and from any other drainage or leakage. The sump is aerated continuously and when desired as a coolant or inoculant the inoculant liquor in the sump is pumped to selected compartments in the units. The same liquid supply lines to the compartments are provided with a source of fresh water and this arrangement has proved of exceptional value in moisture control throughout the entire composting plant. Liquid reinoculation and moisture control are suitably integrated.

A storage bin or curing floor is provided beneath the product discharge port and aeration of the finished compost is continued through floor grates. It will be noted that a compressor supplies air through the plant as desired for suitable aeration.

Thus, a compact and extremely flexible plant and apparatus has been provided for aerobic composting of organic materials on a substantially continuous basis wherein automatic advantage can be taken of the observed cyclic bacterial culture at work in a composting organic mass so as to produce a non-pathogenic product suitable for agricultural application; a plant and apparatus is described wherein all variables in the aerobic composting process are fully controllable.

*Specific description*

Referring more particularly to the drawing. Fig. 1 shows a flow sheet indicating the cyclic nature of the entire composting plant. Raw sewage sludge is admitted to the plant and subjected to suitable liming as necessary. Garbage is picked for removal of tramp iron, glass, and other inorganic material, ground, and is merged with the sewage sludge prior to the liming so that, if necessary, the garbage is adjusted as to its alkalinity. Should liming of the garbage be unnecessary it still can be merged with the sludge to assist in maintaining moisture adjustment prior to dewatering. The sewage sludge proceeds from liming to dewatering. If the garbage has been merged with the sewage sludge both are dewatered and then fed into a mixer. Where garbage alone is fed to the plant or where the garbage requires no adjustment of alkalinity and the moisture in the garbage requires no adjustment, then the garbage moves directly to the mixer. It will be appreciated in this regard that either the sludge or garbage alone can be composted and that proportioning of sewage and garbage can be accomplished where simultaneous feeding of both sludge and garbage is contemplated.

The aqueous material from dewatering is decanted and where it is sufficiently high in organic content, the aqueous material is fed into an inoculant sump, the object of which will be made apparent as the description proceeds. Normally, the aqueous material from dewatering is returned to conventional sewage purification components not a part of the present invention.

The mixer thoroughly agitates the feed material and, if desired, solid inoculant is added to the gelatinous organic mass. The solid inoculant is derived from a fraction of the substantially completely composted product material and, being dry, serves to thicken or reduce the moisture content of the feed while planting known aerobic microorganisms in the organic feed. Liquid inoculant is also available for introduction of aerobic material and for adjusting the moisture content of the feed upwardly where necessary. At this point the addition of aerobic bacteria serves to speed the elimination of noxious odors normally attending the rotting, putrid mass of feed. After the mixing, additional solid inoculant obtained from finished compost can be added as shown and is made possible automatically, as desirable, in the instant composting plant.

The mixed, moisture adjusted, and inoculated feed is fed into composting units which will be described more fully hereinafter. In the compartmental composting units a charge of the material is permitted to react aerobically to oxidize primarily the organic material present therein. Stage by stage (compartment by compartment) the decomposition of the feed occurs. The composting occurs under available controlled moisture conditions and in the presence of intermittent supplies of oxygen-containing gas (air). In vertical stages aerobic conditions are maintained and one charge of material is dropped to a suitable compartment below the initial compartment. The finished composted material is withdrawn from the composter in a substantially dry state where it is available to cure, serve as solid reinoculant, or be sold.

Any liquid material residual in the mixed feed is dropped out of the composter as shown and is channeled to an aerated and agitated liquid inoculant sump or tank. In the inoculant sump all liquid, having a relatively high organic content, is worked under aerobic conditions so that the liquor is available for use as an inoculant or reinoculant while the aqueous fraction is useful in adjusting the moisture content in any given composter unit. The liquor material is sprayed over the decomposing organic mass and serves to cool the charge initially, which is of considerable assistance in preventing too rapid an exothermic release of heat energy which might inhibit the normal growing or life range of the aerobic microorganisms. When an excess of liquor is available, the liquor is shunted back into conventional purification plants for treatment. Thus, the aqueous liquor may be withdrawn before reaching the inoculant sump, as shown.

The composted end product emerging from the composter is led to a grading or screening operation and a fraction of the solid compost is diverted for inoculation and reinoculation usage as shown schematically in Fig. 1.

Figure 2:
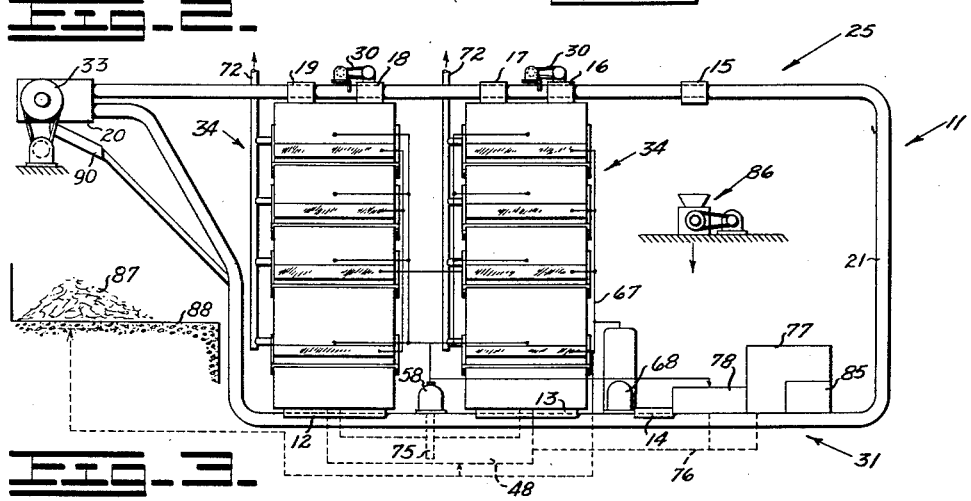
Figure 2 is a schematic elevation view of a composting plant in accord with the present invention showing the relative positioning of the apparatus components and showing the endless conveyor system which integrates the operation of the plant.
Figure 3:
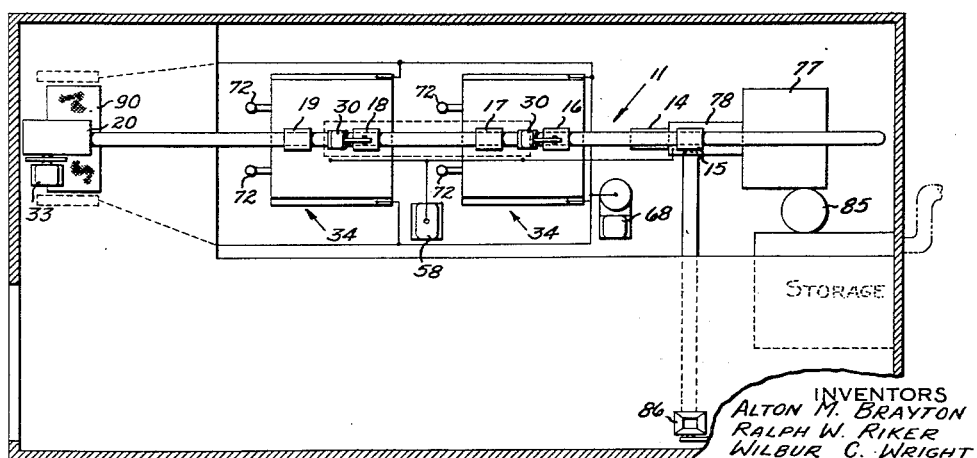
Figure 3 is a plan view of a composting plant as shown in Fig. 2, and schematically indicates the compactness of the plant and the desirable positioning of apparatus components with respect to the endless conveyor system.

The integration of the plant making possible the flexibility indicated in the flow sheet is best suggested by the typical schematic plant layouts shown in Figs. 2 and 3. An endless conveyor 11 provides loading stations 12, 13 and 14 which are selectively closed and opened. The loading is by gravity means. Unloading stations 15, 16, 17, 18, 19 and 20 are also provided and are also gravity operated. The conveyor 11 comprises a tube 21 having an endless chain 22, composed of spaced disc elements 23, passing through said tube 21. The discs 23 are of a diameter substantially equal to the inside diameter of the tubing 21 and are provided with links 24 connecting each of the discs 23 to each other, as shown best in Fig. 8.

The tube conveyor 11 travels in an endless looped path. The upper course 25 is provided with a plurality of unloading stations 15, 16, 17, 18, 19 and 20 as shown in Fig. 2. These unloading stations, for example 15, illustrated in more detail in Figs. 6 and 7, are boxed in by the chute members 26. The trap 27 for each chute 26 comprises a section of the tubing 21, cut away and hinged at one side and biased open or closed as desired by suitable actuation means illustrated specifically as cables 28 and 29. Opening the trap 27 drops the material entrapped between the discs 23. The drop is accomplished by gravity means, but is enhanced by the addition of a shaker or vibrator 30 (Fig. 2) positioned in contact with the tube 21 and above the unloading station. The shaker 30 is not further described since it is of conventional and well known construction serving by mechanical shock to dislodge material from the moving conveyor 11. The shakers 30 are only energized when the trap 27 is open as indicated by the phantom line position in Fig. 7.

The lower course 31 of the tube 21 is provided with openings similar to the unloading stations as illustrated in Figs. 6 and 7. These loading stations 12, 13 and 14 in the lower course 31 permit gravity feeding to the conveyor 11.

The conveyor 11 is driven by a geared sprocket 32 which engages the links 24 between the discs 23 and thus urges the endless movement of the elements within the tube 21. Access to the links 24 is obtained through the final discharge port or unloading station 20. The gear train and motor 33 shown schematically in Fig. 2 are not further described and Fig. 8 best illustrates the sprocket engagement with the links 24 finally moving the conveyor 11.

A plurality of composting units 34 are positioned between the upper course 25 and the lower course 31 of the conveyor 11. Each unit 34 is beneath unloading ports or stations 16 and 17, for example, and over a loading port or station 12, for example. Each composting unit 34 is comprised of two vertical chambers 35 in back-to-back relationship. Each vertical chamber 35 is compartmentalized into a plurality of vertically stacked compartments 36. Clam shell drop bottoms 37 serve to separate each compartment 36 from its adjacent upper and lower compartments 36. The outward pivotal movement of a clam shell bottom 37 relieves the contents of each compartment 36 successively into the compartment 36 directly beneath. The clam shell bottoms 37 normally rest against the chamber back wall 38. A hoist (not shown) provides power for pivoting the bottoms 37 outwardly and away from the back wall 38, thus effectively emptying the contents of the compartment 36 since the lip 39 of the front wall 40 of each chamber 35 serves to rake the organic material cleanly from the clam shell bottom 37 as the bottom 37 is pivoted outwardly. The trunnions 41 of the bottoms 37 extend through the side walls 42 and 43 and spacing sleeves 44 assure a fixed clearance between the walls 42 and 43 and the end panels 45 of the bottoms 37. The spaced extension 46 of the bottoms 37 beyond the wall 42 permits suitable draining of any excess liquor from compartments 36. Drain spouts 47 are provided in the bottom 37 outside the compartment 36 and suitable drain lines (not shown) conduct the drainings to an inoculant sump 48 as desired. The clearance provided between wall 42 and end panels 45 also permits the insertion of an agitator drive sprocket 49 between the end 45 of the bottom 37 and the chamber side wall 42. The sprocket 49 is keyed to an agitator shaft 50 running longitudinally through each of the compartments 36. Tines 51 are integrally and radially connected to the agitator shaft 49 at spaced intervals. An agitator drive motor 52 with pinion sprocket 53 is driveably linked with the agitator drive sprocket 49 as through the link chain 54. In parallel relation to the agitator shaft 50 through the chamber side wall 42 and in the upper portion of each compartment 36 a perforated liquid spray pipe 55 extends into each compartment 36. A liquid supply line 56 vertically parallels the side 42 of the composter unit 34 and is provided with a valved branch line 57 leading to the liquid spray pipe 55 serving each compartment 34. Fig. 11 best illustrates the indicated relationship in a typical compartment 34. The branch line 57 from each compartment 36 leads to the liquid inoculant supply line 56 connected to a pump 58 having its suction side in the aerated inoculant sump 48. A branch T 59 is provided in the inoculant supply line 56 above the pump 58 so that the inoculant line 56 can be used for the insertion of fresh water where desirable or necessary for moisture or thermal adjustment. A valve 60 normally closed admits fresh water from any suitable source when desired. Moisture control valves 61 (as shown in Fig. 4) permit selective flow control to each compartment 36.

On the face of each composter unit 34 is located a manifold 62. The location of the manifold 62, in clearance relationship to the swing of the clam shell bottoms 37, is best illustrated in Fig. 5. The back 63 of the manifold 62 comprises the face wall 40 of the unit 34 and is provided with openings 64 therethrough for the connection of aeration tubes 65. As best illustrated in Fig. 11, the tubes 65 pass transversely through the compartment 36 and connect to the compartment back wall 38. The arrangement is such as to pass transversely through the aerobic decomposting mass while clearing interference with the agitator shaft 50 and the tines 51. The tubes 65 are provided with nozzles or orifices 66. As air or oxygen-containing gas is passed into the manifold 62, the oxygen-containing gas is distributed by the tubes 65 uniformly through the organic mass as desired. An air line 67 suitably connected to a compressor 68 (Figs. 2 and 3) serves to feed the compressed oxygen-containing gas to the manifolds 62 of each compartment 36. Air valves 69 selectively provide control over air admission to the compartments 36.

Exhaust vents 70 are provided near the top of each compartment 36 through the side wall 42 thereof. The exhaust lines 71 communicate the exhaust fumes, e.g., carbon dioxide and water vapor, to the stack 72 through which the fumes are exhausted to the atmosphere. A draft fan (not shown) may be inserted in the exhaust stack 72 as desired. In Fig. 11 the clearance relationship of the exhaust stacks 72 with other components, for example the compartment agitator motor 52 and the bottom 37, is best shown. The lowermost of the compartments 36 straddles in chute manner the port 13 opening into the conveyor 11. Fully composted material is thus fed to the conveyor 11 for removal.

A liquid inoculant sump 48 is located beneath the composter units 34. Any excess of liquid from the composter unit 34 drains through perforations in the conveyor opening 13 and into the sump 48. The material in the sump 48 is constantly aerated by the supply of an oxygen-containing gas bubbled through a foraminous floor 73 in the sump 48. The sump air line 74 from the compressor 68 provides oxygen-containing gas feed (see Figs. 2 and 4).

The liquid pump 58 with its suction line 75 draws liquid inoculant from the sump 48 as desired. Drains 76 from the dewatering apparatus 77 and mixer 78 are likewise led into the sump 48.

The mixer 78 is of the hollow screw type best shown in Figs. 9 and 10. The hopper 79 provides entry for solid or liquid inoculant and dewatered organic material such as garbage, sewage sludge, or both. The hopper 79 being located beneath an opening 15 in the conveyor 11 is ideally located for solid inoculation or adjustment of moisture where necessary. The hollow screw 80 provides ideal means for thermally adjusting the temperature of the mixed material prior to charging the composter units 34. Coolant or heating medium is passed through the screw 80 and thereby extracts or adds heat to the organic mass as desired. The screw 80 is provided with a housing 81 and a base 82, and feeds the mixed organic material into the conveyor 11 through the loading gate 14. A hood 83 encloses the screw 80 of the mixer 78 and is provided with a gas exhaust column 84.

A dewatering unit 77 such as a filter, classifiers, or the like, well known in the art, receives sewage sludge and/or garbage and removes a substantial part of excess water. A liming chamber 85 provides for adjustment of acidity where required and the garbage and/or sewage sludge is delivered to the mixer 78. The water extracted during dewatering is returned for further treatment to an associated sewage plant not a part of the present invention or may be entrained in drains 76 to the liquid inoculant sump 48. Figs. 2 and 3 best illustrate the association of the mixer 78, dewatering unit 77 and liming chamber 85.

A grinder, crusher, or other comminuting device 86 is customarily employed to rough process raw garbage after the removal of tramp iron and glass. The schematic positioning of the comminutor 86 is best illustrated in Figs. 1, 2 and 3.

At the final discharge 20 from the conveyor 11, the fully composted material 87 is screened and graded and stored on the concrete floor 88 for curing. The screening and grading is indicated schematically, but it will be seen that the curing floor 88 is provided with drains and lines for liquid and air or other oxygen-containing gas which is percolated upward through the loose curing compost 87 if desired.

In the top of each unit 34 a vane 89 is provided as shown in Fig. 5 which directs incoming material selectively to one or the other of compartments 36 at the front and back of the unit 34. The vane 89 is composed of a hinged metal sheet as indicated. The organic material fed to the composter unit 34 from the conveyor 11 is thus charged as desired on one or the other side of the unit 34.

*Operation*

In operation, sewage sludge is admitted to the plant and dewatered. Garbage is admitted to the plant, is picked, comminuted, and merged with the sewage and suitably adjusted as to alkalinity or acidity. At mixing, the garbage and sewage are intermingled and by reason of the thermally controlled mixer 78 the temperature of the mixture is held at any desired point. Completed compost material may be introduced to the mixer 78 as desired by inoculation practice and for moisture control. The introduction of the inoculant compost to the mixer 78 is accomplished by gravity drop from the conveyor 11 through port 15 directly above the hopper 79 of the mixer 78.

The screw 80 forces the raw organic mix into the conveyor 11 where it is cycled to the stations such as 16 above the composting units 34. The organic material is selectively dropped into the units 34 by the opening of desired chutes 26. The loading vane 79 in the top of the units 34 loads one or the other of the two columns of compartments in each unit 34. Mechanical shakers 30 assure a complete gravity drop of the raw organic material. Thus, the uppermost of the compartments 36 is loaded and subsequently inoculated, if desired, from the same conveyor 11 and chute 26 by completely composted material cycled from the bottom of the composter units 34. Additional inoculation or reinoculation with liquid inoculant is accomplished by pumping liquid inoculant from the sump 48 into the selected compartments 36 and over the organic material. The term "reinoculation" where used herein, has reference to the supplemental inoculation of the organic charge with sump cultured liquid or solid product after initial inoculation. In this manner, liquid inoculation and moisture balance is supplied. Through the same liquid inoculant line 56 fresh water may be added for thermal and moisture control. Air is percolated through the charge in the compartment 36 and mechanical agitation is accomplished in the mass by rotation of the agitator shaft 50 and the tines 51 moving through the mass. Exhaust gases are exited from the compartment 36 to the stack 72 and out of the plant. Shortly after inoculation and after bacterial action is initiated, no disagreeable odors are observed. After aerobic activity has progressed satisfactorily, the drop bottom 37 is pivoted outwardly and the material in the uppermost compartment 36 is dropped to the next lower compartment 36 where it is subjected to similar mechanical treatment. Compartment 36 by compartment 36, the material is dropped downwardly as aerobic composting proceeds. In the bottom-most compartment 36a the material, in its substantially completely composted form, is loaded into the conveyor 11 assisted by the chute-like converging walls of the bottom-most portion of each unit 34. The completely composted material may then be used as solid inoculant or delivered to suitable screens 90 and grading equipment for packaging, shipment, or further curing, as desired.

It will be understood that after each drop of organic material to the next lowest compartment the then emptied compartment is recharged. In each compartment 36 it will be seen that excellent control over agitation of the mass, aeration, reinoculation, control of moisture, and control of temperature is accomplished by reason of the novel mechanical structure of the composting unit 34 and its novel integration into the balanced disposal plant.

While the tiers of compartments 36 in each unit 34 have been illustrated as comprising four compartments, it will be understood that any plurality of stacked compartments, otherwise being provided with the means of selective control of composting conditions, is intended to be included within the scope of the present invention.

While the organic material treated has been specifically indicated as sewage sludge, and/or garbage, it will be understood that the plant and composter herein described is capable of treating a wide range of organic material and industrial organic waste admitting of aerobic decomposition.

Structural fabrication of the composting units 34 has been accomplished by welding of uniform structural members. Vertical columns 91 and channels 92 as best illustrated in Fig. 11 support the plurality of compartments 36 on either side of the unit 34.

It will be understood that certain other modifications can be made in the plant and composting units 34 which are within the skill of the art. Such modifications are intended to be included in the description and are intended to be included in the following claims unless the claims negative such inclusion.

We claim:
1. An aerobic composting machine for organic material comprising: a plurality of individual vertically stacked compartments one above the other; means in each of said compartments for selectively providing aeration, agitation, liquid innoculation and exhaust; pivot clamshell type release gates comprising the bottoms of each of said compartments and separating each compartment from the compartment beneath and adapted to release and invert the organic material, as it is released, to said compartment beneath; and a closed tube conveyor encircling said plural compartments and adapted to receive material from the lowermost compartment, to selectively load the uppermost of said compartments and to additionally discharge the end products.

2. A machine according to claim 1 wherein the closed tube conveyor is of an endless type having a plurality of discharge outlets between the point for receiving and the point for reloading said composting unit.

References Cited in the file of this patent
UNITED STATES PATENTS

| | | |
|---|---|---|
| 253,111 | Scholfield | Jan. 31, 1882 |
| 259,202 | Petri | June 6, 1882 |
| 312,341 | Duryes | Feb. 17, 1885 |
| 410,085 | Gent | Aug. 27, 1889 |
| 936,011 | Meyer | Oct. 5, 1909 |
| 1,832,179 | Boggiano-Pico | Nov. 17, 1931 |
| 2,043,265 | Roeder | June 9, 1936 |
| 2,178,818 | Earp-Thomas | Nov. 7, 1939 |
| 2,209,613 | Roeder | July 30, 1940 |
| 2,474,833 | Eweson | July 5, 1949 |
| 2,734,803 | Ruskin | Feb. 14, 1956 |
| 2,798,800 | Geraghty et al. | July 9, 1957 |